(12) United States Patent
Leen

(10) Patent No.: US 11,444,845 B1
(45) Date of Patent: Sep. 13, 2022

(54) PROCESSING REQUESTS USING COMPRESSED AND COMPLETE MACHINE LEARNING MODELS

(71) Applicant: Amazon Technologies, Inc., Seattle, WA (US)

(72) Inventor: David Leen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 16/293,494

(22) Filed: Mar. 5, 2019

(51) Int. Cl.
| | |
|---|---|
| *H04L 41/16* | (2022.01) |
| *H04L 67/1008* | (2022.01) |
| *G06N 20/00* | (2019.01) |
| *H04L 41/5009* | (2022.01) |
| *H04L 43/16* | (2022.01) |
| *H04L 67/60* | (2022.01) |

(52) U.S. Cl.
CPC ............ *H04L 41/16* (2013.01); *G06N 20/00* (2019.01); *H04L 41/5009* (2013.01); *H04L 43/16* (2013.01); *H04L 67/1008* (2013.01); *H04L 67/32* (2013.01)

(58) Field of Classification Search
CPC ..... H04L 41/16; H04L 41/5009; H04L 67/32; H04L 67/1008; H04L 43/16; H04L 41/50; H04L 67/2833; H04L 43/08; H04L 12/24; H04L 12/26; H04L 12/1813; H04L 12/1881; H04L 29/08; G06N 3/02; G06N 3/04; G06N 3/063; G06N 3/082; G06N 3/0445; G06N 3/0454; G06N 20/00; G06F 9/461; G06F 9/488; G06F 9/544; G06F 9/5011; G06F 9/505

USPC .................................................. 709/224, 223
See application file for complete search history.

(56) References Cited

U.S. PATENT DOCUMENTS

| | | | | |
|---|---|---|---|---|
| 2015/0379429 | A1* | 12/2015 | Lee .......................... | G09B 5/00 706/11 |
| 2016/0217369 | A1* | 7/2016 | Annapureddy ........ | G06N 3/082 |
| 2016/0224951 | A1* | 8/2016 | Hoffberg ................ | G06Q 40/04 |

(Continued)

OTHER PUBLICATIONS

Li M, Andersen DG, Park JW, Smola AJ, Ahmed A, Josifovski V, Long J, Shekita EJ, Su BY. Scaling distributed machine learning with the parameter server. In 11th {USENIX} Symposium on Operating Systems Design and Implementation ({OSDI} 14) 2014 (pp. 583-598). (Year: 2014).*

(Continued)

*Primary Examiner* — James N Fiorillo
(74) *Attorney, Agent, or Firm* — Robert C. Kowert; Kowert, Hood, Munyon, Rankin & Goetzel, P.C.

(57) ABSTRACT

A machine learning-based service processes requests using compressed and complete models to provide faster response times for servicing requests to process data. Initially, a host processes data using a compressed model that is stored in the host's memory and then switches to a larger, more accurate complete model after it is loaded into the host's memory. A host of the machine-learning based service may receive one or more requests to process data. In response, the host uses a compressed version of a model to begin processing the data. The host starts loading the complete version of the model into the host's memory. When the complete version of the model is loaded into memory, the host switches to process a remaining portion of the data using the complete version of the model.

20 Claims, 11 Drawing Sheets

(56) References Cited

U.S. PATENT DOCUMENTS

| | | | |
|---|---|---|---|
| 2016/0328644 A1* | 11/2016 | Lin | G06N 3/084 |
| 2016/0328661 A1* | 11/2016 | Reese | G06N 7/005 |
| 2017/0220925 A1* | 8/2017 | Alsharif | G06N 3/08 |
| 2018/0307987 A1* | 10/2018 | Bleiweiss | G06N 5/04 |
| 2018/0308203 A1* | 10/2018 | Appu | G06F 9/544 |
| 2019/0041845 A1* | 2/2019 | Cella | G06N 20/00 |
| 2019/0057314 A1* | 2/2019 | Julian | G06V 30/2504 |
| 2019/0146474 A1* | 5/2019 | Cella | G05B 23/0286 |
| | | | 702/188 |
| 2019/0281172 A1* | 9/2019 | Baba | G06N 3/0454 |
| 2019/0318245 A1* | 10/2019 | Song | G06N 3/082 |
| 2019/0324856 A1* | 10/2019 | Zhao | G06T 1/20 |
| 2019/0378014 A1* | 12/2019 | Yamamoto | G06N 3/084 |
| 2020/0026977 A1* | 1/2020 | Lee | G06K 9/00536 |
| 2020/0042596 A1* | 2/2020 | Ravi | G06N 3/063 |
| 2020/0050846 A1* | 2/2020 | Sharma | G06N 5/00 |
| 2020/0105256 A1* | 4/2020 | Fainberg | G10L 15/30 |
| 2020/0118031 A1* | 4/2020 | Reese | G06N 7/005 |
| 2020/0125956 A1* | 4/2020 | Ravi | G06N 3/0454 |
| 2020/0143250 A1* | 5/2020 | Lee | G06N 3/04 |
| 2020/0175387 A1* | 6/2020 | Braz | G06N 20/00 |
| 2020/0225655 A1* | 7/2020 | Cella | G05B 23/0264 |
| 2021/0133630 A1* | 5/2021 | Dalli | G06N 5/045 |
| 2021/0157312 A1* | 5/2021 | Cella | G06N 5/04 |
| 2021/0232920 A1* | 7/2021 | Parangi | G06F 16/2457 |
| 2021/0295174 A1* | 9/2021 | Zhang | G06V 10/95 |

OTHER PUBLICATIONS

Li M, Andersen DG, Park JW, Smola AJ, Ahmed A, Josifovski V, Long J, Shekita EJ, Su BY. Scaling distributed machine learning with the parameter server. In 11th {USENIX} Symposium on Operating Systems Design and Implementation ({OSDI} 14) 2014 (pp. 583-598). (Year: 2014) (Year: 2104).*

* cited by examiner

PROCESSING REQUESTS USING COMPRESSED AND COMPLETE MACHINE LEARNING MODELS

BACKGROUND

Machine learning techniques are used in a variety of applications, from recognizing people and objects in images to detecting the sentiment of a text message. Certain types of machine learning models can produce more accurate results than others. For example, deep learning models may be used to analyze image data from a video camera and correctly identify people based on facial recognition or correctly identify various types of animals, whereas simpler or less advanced machine learning models may be unable to identify some of those people or be unable to identify some of the animals even though the same image data is used.

A drawback of using deep learning models and other types of higher accuracy models is the size of the models. In particular, a deep learning model can be 100 to 1000 times larger in size than a corresponding non-deep learning model (e.g., 1 MB for a non-deep learning model vs. 1 to 10 GB for a deep learning model). Therefore, the number of deep learning models that can reside in the memory of one host machine may be highly constrained (e.g., one model or a small number of models). Therefore, a host machine that is part of a machine-learning based service may require time to load a deep learning model into memory before it can begin servicing a request from a client to analyze data. Another drawback of using deep learning models is that they may require specialized hardware to run on host machines. Therefore, scaling a machine-learning based service by adding a large number of host machines with different deep learning models may become extremely expensive.

Figure 1:
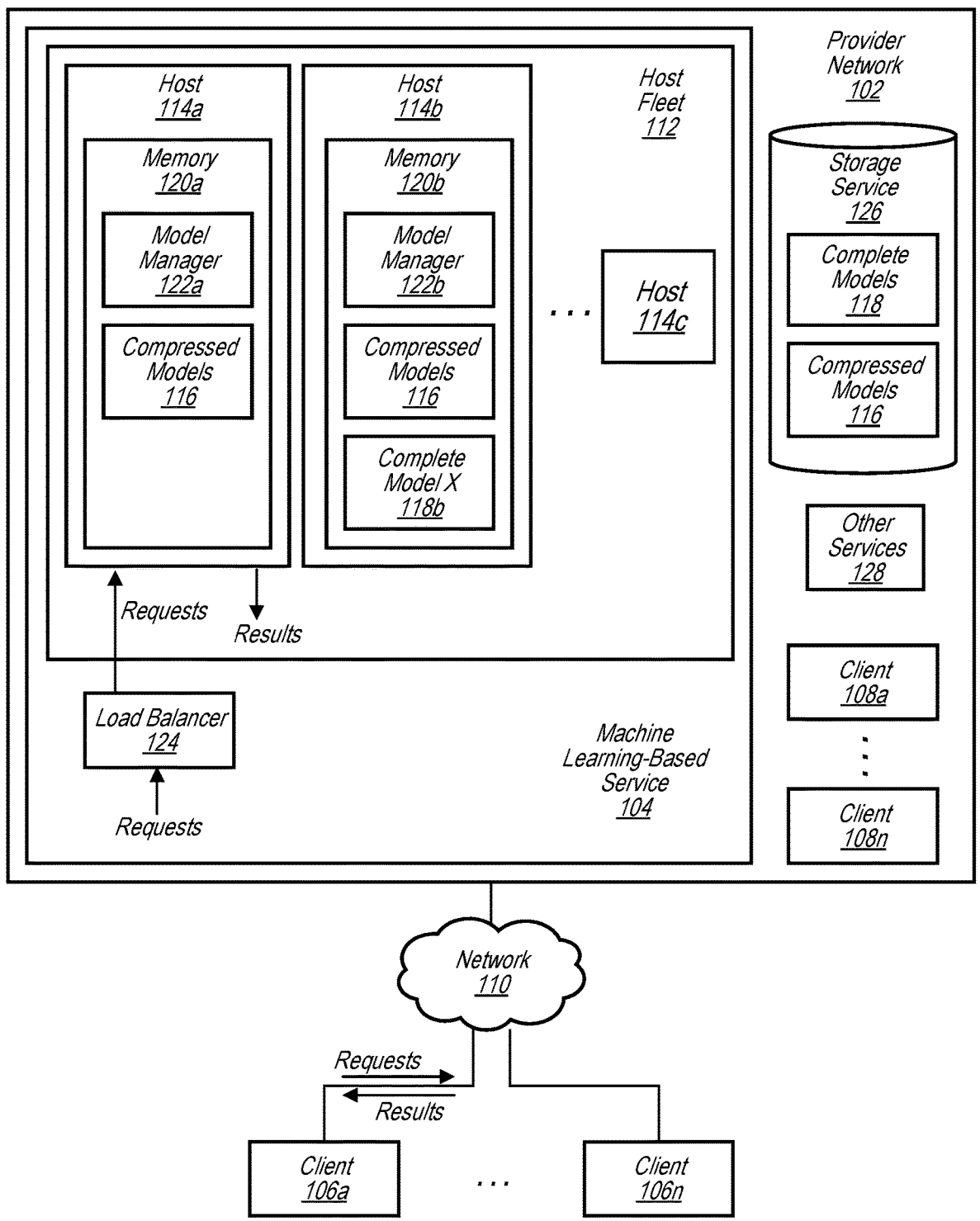
FIG. 1 illustrates a system for processing requests using compressed and complete machine learning models, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for processing requests using compressed and complete machine learning models. Embodiments may allow a machine learning-based service to initially service requests to process data using a compressed model that is stored in a host's memory and then switching to a larger, more accurate complete model after it is loaded into the host's memory.

By storing multiple compressed models in a host's memory, a host is capable of immediately processing different types of service requests for different data domains (e.g., different languages), although the compressed models may produce less accurate results compared to the corresponding complete model. In embodiments, the same host to be re-used to service requests for many different data domains, which may reduce the number of different hosts required by the service. Therefore, embodiments allow for faster response time to service requests, while also reducing the cost to provide the service.

In various embodiments, a machine learning model may be any type of data processing model suitable for processing input data to generate one or more results (e.g., classified data or a prediction). A given machine learning model may by one of various types of models such as an artificial neural network, deep neural network (e.g., deep learning model), static or dynamic neural network, a memory network, support vector machines, Bayesian algorithms, genetic algorithms, decision tree, binary classification, multiclass classification, regression, and/or any other model architecture suitable for processing data and generating one or more results/predictions. Thus, in embodiments, a model may include any computational model, machine learning model, or artificial intelligence model suitable for processing data, classifying data, and/or generating one or more results/predictions.

In embodiments, any suitable techniques for generating a compressed version of a corresponding complete version of a model may be used. For example, a compressed model may be generated by converting a complete model to a smaller, compressed version of the complete model based on quantization or reducing a number of layers, as discussed below. In embodiments, a compressed version of a corresponding complete version of a model may be generated using any other suitable technique. For example, the compressed version may be a different type of model than the corresponding complete version. Therefore, as long as the compressed model is capable of processing data that belongs to the same domain as the corresponding complete model (e.g., a specific language), then the compressed model may be used to service requests that indicate the complete model as the target model for processing data.

In various embodiments, any suitable security communication protocols may be used to protect data that is being sent between any devices, resources, and/or networks (e.g., provider network, client networks, remote networks, etc.). For example, data may be encrypted using SSL (secure socket layer), TLS (transport layer security), HTTPS (secure hypertext transfer protocol), and/or any other suitable network security protocol.

FIG. 1 illustrates a system for processing requests using compressed and complete machine learning models, according to one embodiment. The example provider network 102 includes a machine learning-based service 104 that may process data on behalf of one or more remote clients 106 and/or one or more internal clients 108. In embodiments, some or all of the techniques described herein with respect to remote clients 106 may also apply for the internal clients 108.

In embodiments, a given client 106 may be a client computing device of a remote client network. For example, the client 106a may be a client computing device of a remote client network and the client 106n may be another client computing device of another remote client network. As depicted, a wide-area network 110 (e.g., the internet) may allow for communication of data between the remote clients 106 and the provider network 102 or between client computing devices of one or more other remote networks and the provider network 102.

The machine learning-based service 104 may include a host fleet 112 that includes any number of hosts 114 that may each execute one or more compressed models 116 and/or one or more complete models 118 (e.g., model X 118b) stored in are stored in operating memory 120. In embodiments, the memory 120 may be non-volatile random access memory for an operating system/execution environment (e.g., system memory 1120 of FIG. 11) or any other operating memory suitable for executing machine learning models and/or a model execution framework (as opposed to persistent storage such as hard disks, etc.). In embodiments, each host 114 may be a host server or other host computing device. As shown, each host 114 may also include a model manager 122 that may perform various functions, including communicating with other hosts 114 or a load balancer 124.

In some embodiments, a host 114 may obtain one or more complete models 118 and/or one or more compressed models 116 and store the obtained models into memory 120. In various embodiments, the complete models 118 and/or the compressed models 116 may be obtained from the storage service 126, a persistent local storage of the host 114, another location within the service 104 or the provider network 102, and/or a location external to the provider network (e.g., a remote network of the client 106 or another remote network). The models may be trained by the machine learning-based service 104, another service 128, or at a location external to the provider network (e.g., a remote network of the client 106 or another remote network).

As depicted, the machine learning-based service 104 (e.g., a host 114) may receive from a client one or more requests to process data. In some embodiments, the request may indicate a location of the data to be processed or the request may include the data to be processed. In embodiments, the one or more requests may be one request that indicates a location of the data, multiple requests that indicate respective locations of data, one request that includes data (e.g., streaming data over a period of time), and/or multiple requests that respectively include data.

The request may indicate a model to be used to process the data. In embodiments, to indicate the model to be used, the request may indicate one of the complete models 118, indicate a type of data or domain that the data belongs to (e.g., Spanish language, images of animals, etc.), and/or may include one or more characteristics of data to be processed that are unique to the domain. Therefore, in some embodiments, the service 104 (e.g., model manager 122) may determine which model is indicated by the request by first analyzing the one or more characteristics of the data included in the request and determining that the one or more characteristics are unique to the domain and/or determining based on the analysis that one of the compressed and/or complete models is suitable to process the data. Although the term "indicated model" is used herein, in embodiments this phrase may be replaced by "model," since various embodiments may not require the model to be indicated in the request.

In some embodiments, a host may include multiple copies of the same compressed model. In those cases, the request may not indicate the model to be used or the type of data/domain because all of the compressed models can process the same input data. In such embodiments, the service would have no need to determine which of the compressed models to use in order to process the data. In embodiments, this may allow multiple compressed models to be used concurrently and if necessary, one or more corresponding complete models may be loaded on the same host and/or one or more other hosts.

In response to receiving the one or more requests to process the data, the host may process a portion of the data using one of the compressed versions of models that corresponds to a complete version of the indicated model to generate one or more results. The host may then return the one or more results to the client (or send them to another endpoint). The host may also begin loading the complete version of the indicated model into the memory 120 at approximately the same time as receiving the one or more requests or at a subsequent time.

In embodiments, the service 104 may implement any suitable application programming interface (API) that includes functionality to process requests received from clients and/or to process results to send to clients. In embodiments, the API may format requests received from a client before sending the requests to a given host. In various embodiments, the API may be process the requests before, within, or after the load balancer. Similarly, the API may format results generated by a model/host before sending the results to a given client.

Upon completion of loading of the complete version of the indicated model into memory, the host may then switch to using the complete version of the indicated model to process other portions of the data. The host may then return one or more other results to the client (or send them to the endpoint). In embodiments, the complete version of the model is larger than the compressed version and produces more accurate results than the compressed version. In some embodiments, the complete version may be approximately the same size as the compressed version or smaller than the compressed version, but requires a longer amount of time to generate results that are more accurate than the compressed version.

In embodiments, the host may determine that an amount of data to be processed using the compressed version of the indicated model exceeds a threshold amount and in response, the host may begin to load the complete version of the indicated model into the memory of the host. The host may determine that the amount of data to be processed exceeds a threshold amount in various ways. For example, the host may determine that a size of the data indicated by the request to be processed using the compressed version (e.g., indicated by the request or determined by the service) exceeds a threshold amount, a size of data included in the request exceeds a threshold amount, a number of received requests to be processed using the compressed version of the model exceeds a threshold amount, a rate of received requests to process data using the compressed version of the model exceeds a threshold amount, and/or a change in the rate of received requests to be processed using the compressed version of the model exceeds a threshold amount.

In some embodiments, a machine learning model of the service 104 (e.g., within model manager 120 or load balancer 124) may predict the amount of data to be processed by the compressed version of the model during an upcoming period of time based on one or more of the above factors (e.g., measured at a point in time or over a time window) and/or based on a change in one or more of the above factors (e.g., measured at a point in time or over a time window). If the predicted amount of data to be processed exceeds a threshold amount, then the host may begin to load the complete version of the indicated model into the memory of the host.

Figure 2:
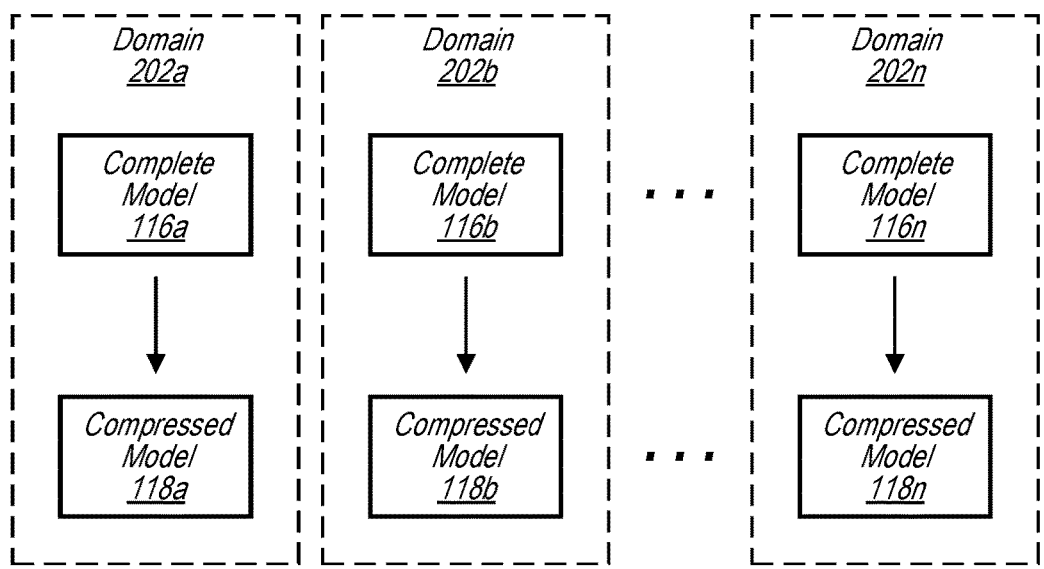
FIG. 2 illustrates different domain-specific complete models that are converted to compressed models, according to one embodiment.

FIG. 2 illustrates different domain-specific complete models that are converted to compressed models, according to one embodiment. As shown, the machine learning-based service 104 may include any number of complete models 116 that are configured to process data belonging to any number of corresponding domains 202. A compressed model 118 corresponding to each of the complete models 116 may be generated using any suitable technique. In embodiments, a given compressed model will be smaller in size than the corresponding complete model, but the compressed model produces less accurate results for at least some input data. Thus, in embodiments, the complete version of a model is larger than the compressed version of the model and produces more accurate results than the compressed version of the model (e.g., for at least some sets of input data).

Figure 3:
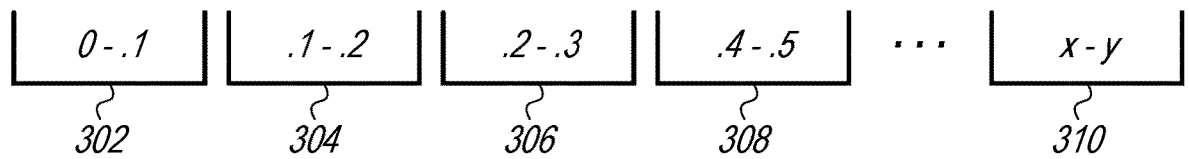
FIG. 3 illustrates a quantization technique that may be used to convert a complete model to a compressed model, according to one embodiment.

FIG. 3 illustrates a quantization technique that may be used to convert a complete model to a compressed model, according to one embodiment. In embodiments, a complete model may include a large number of floating point numbers (e.g. a deep-learning model). The complete model may be "quantized" by discretizing the floating point numbers into buckets. As shown, one bucket includes the range (0.0, 0.1) and another bucket includes the range (0.1, 0.2). Therefore, a number such as 0.1243 would be assigned to bucket 304.

Another method of quantizing a complete model is by discretizing the floating point numbers be using less precision. For example, a 32 bit number might be transformed into a number that only has 16 bits of precision. By using the above techniques or other suitable techniques, a complete model may be "quantized" into a much smaller model (e.g., 10, 100, or 1000 times smaller). The smaller the model, the less accurate the results may be. Thus, a model may be reduced to any suitable size, depending on the minimum desired level of accuracy or minimum desired reduction in accuracy level.

As mentioned above, any other suitable technique other than quantization may be used to generate a compressed model that corresponds to a complete model. For example, a number of layers in a deep learning or deep neural network model may be reduced to generate the compressed model. In embodiments, a completely different type of model may be used to generate the compressed model that corresponds to a complete model.

Figure 4A:
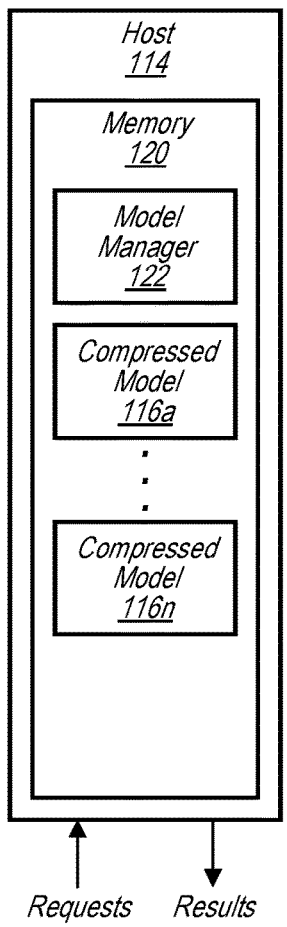
FIG. 4A is a block diagram of a host that services requests using one or more compressed models, according to one embodiment.

FIG. 4A is a block diagram of a host that services requests using one or more compressed models, according to one embodiment. As shown, a host 114 of the service 102 receives one or more requests to process data, the one or more requests indicating a model (e.g., a complete version of the model). In response, the host processes a portion of the data using a compressed version of the indicated model that corresponds to a complete version of the indicated model to generate one or more results. In some embodiments, the host may first determining that the compressed version corresponds to the model indicated by the request and in response, selecting the compressed version from among the multiple compressed models on the host to process the data, and then processes a portion of the data using the selected compressed model.

As discussed above, the host may begin loading a complete version of the indicated model that corresponds to the compressed version. In embodiments, the host may begin loading the complete version of the indicated model in response to determining that an amount of data to be processed using the compressed version of the indicated model exceeds a threshold amount. The host may also indicate to the load balancer 124 that the complete model began loading into the memory of the host. In some embodiments, the host may indicate to one or more other hosts of the fleet that the complete model began loading into the memory of the host (e.g., via a gossip protocol).

Figure 4B:
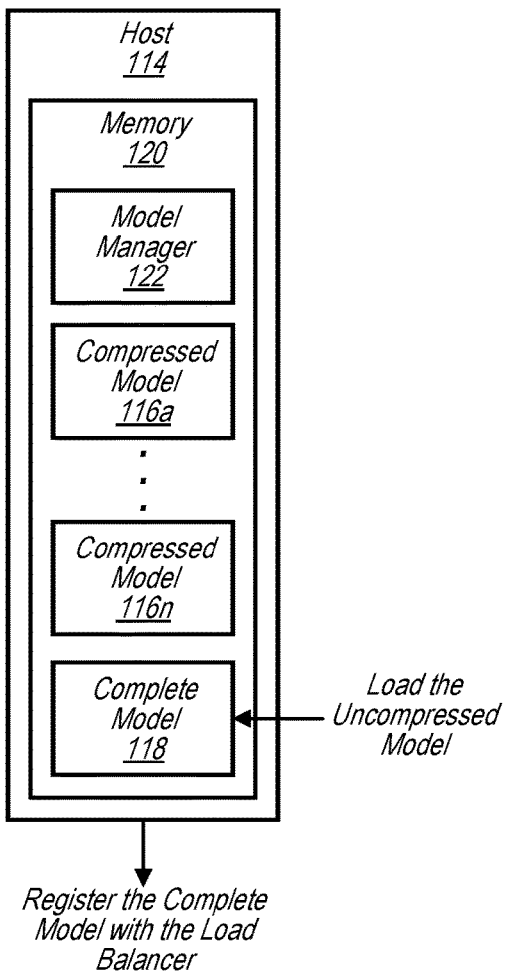
FIG. 4B is a block diagram of a host that includes compressed models and a complete model that is loaded in memory, according to one embodiment.

FIG. 4B is a block diagram of a host that includes compressed models and a complete model that is loaded in memory, according to one embodiment. As shown, the complete model 118 has been loaded into memory of the host. In embodiments, the host may indicate to the load balancer that the complete model has completed loading into the memory of the host register the complete model with the load balancer 124 (e.g., register the complete model with the load balancer 124). In some embodiments, the host may indicate to one or more other hosts of the fleet that the complete model has completed loading into the memory of the host (e.g., via a gossip protocol). In some embodiments, some or all of the compressed models (and in some cases one or more other complete models) may be removed from the memory 120 (e.g., deleted) before or during the loading of the complete model 118 in order to free up a sufficient amount of memory to load the complete model 118 into the memory 120.

In some embodiments, after a particular host receives an indication from another host (or from the load balancer) that the complete model has completed loading in another host, then the particular host may stop loading a complete model that is currently being loaded (e.g., abort loading the complete model). This may occur when there is a need for one new complete model for the fleet to process requests, but there is not a need for two complete models to process the requests (due to a relatively low number of the requests that require use of that model). Thus, the particular host may be free to continue processing requests using any of the compressed models (instead of being restricted to using the complete model due to limited memory size of the particular host).

Figure 4C:
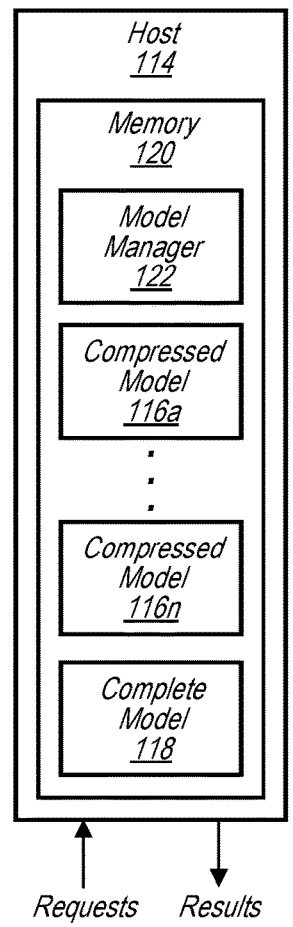
FIG. 4C is a block diagram of a host that services requests using a complete model, according to one embodiment.

FIG. 4C is a block diagram of a host that services requests using a complete model, according to one embodiment. As shown, the host receives one or more subsequent requests to process data, the one or more subsequent requests indicating the model (e.g., a complete version of the model). In response, the host processes another portion of the data using the complete version of the indicated model that was loaded at FIG. 4B to generate one or more results.

Figure 5A:
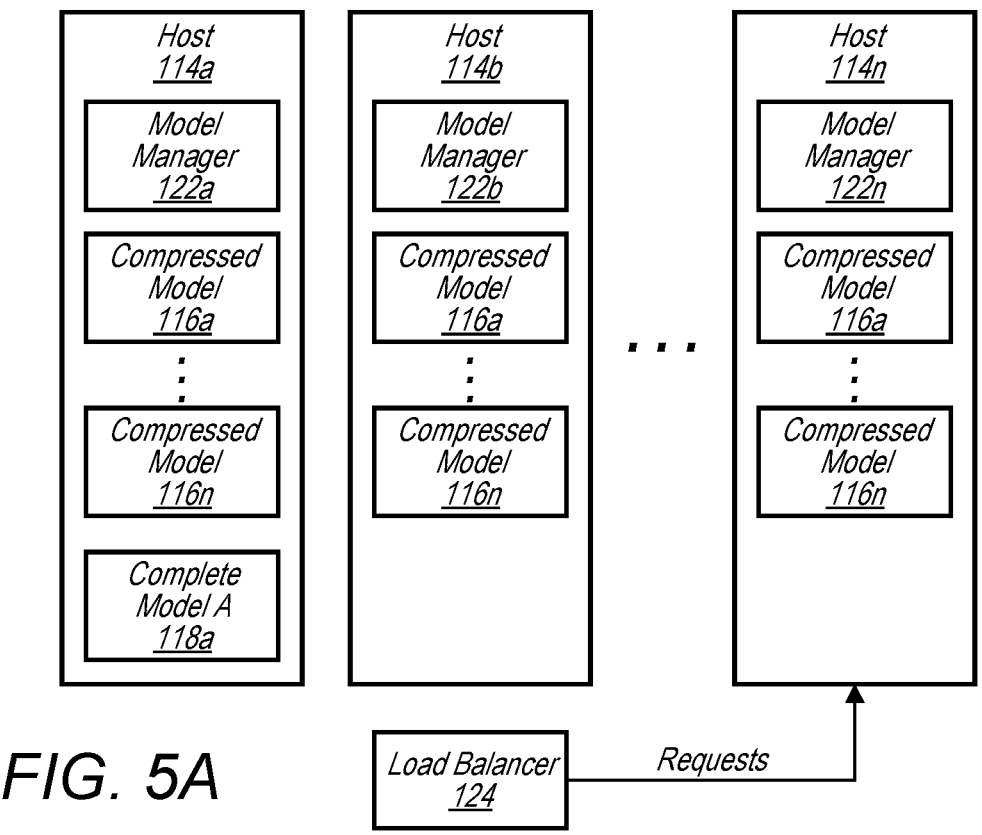
FIG. 5A is a block diagram of a host fleet and a load balancer sending a request to a particular host that services the request using a compressed model, according to one embodiment.

FIG. 5A is a block diagram of a host fleet and a load balancer sending a request to a particular host that services the request using a compressed model, according to one embodiment. As depicted, a load balancer receives one or more requests to process data, the one or more requests indicating a model to process the data.

In the example embodiment, the load balancer determines that there are not any hosts available to process the data using a complete version of the indicated model. In response, the load balancer selects the host 114n from among the hosts that are available to process the request (114b-114n) according to a load balancing algorithm. In embodiments, any suitable load balancing algorithm may be used (e.g., round-robin). In embodiments, the server with the lowest current workload may be selected. The load balancer then sends the one or more requests to the selected host 114n to process the data using the compressed model that corresponds to the indicated model.

Figure 5B:
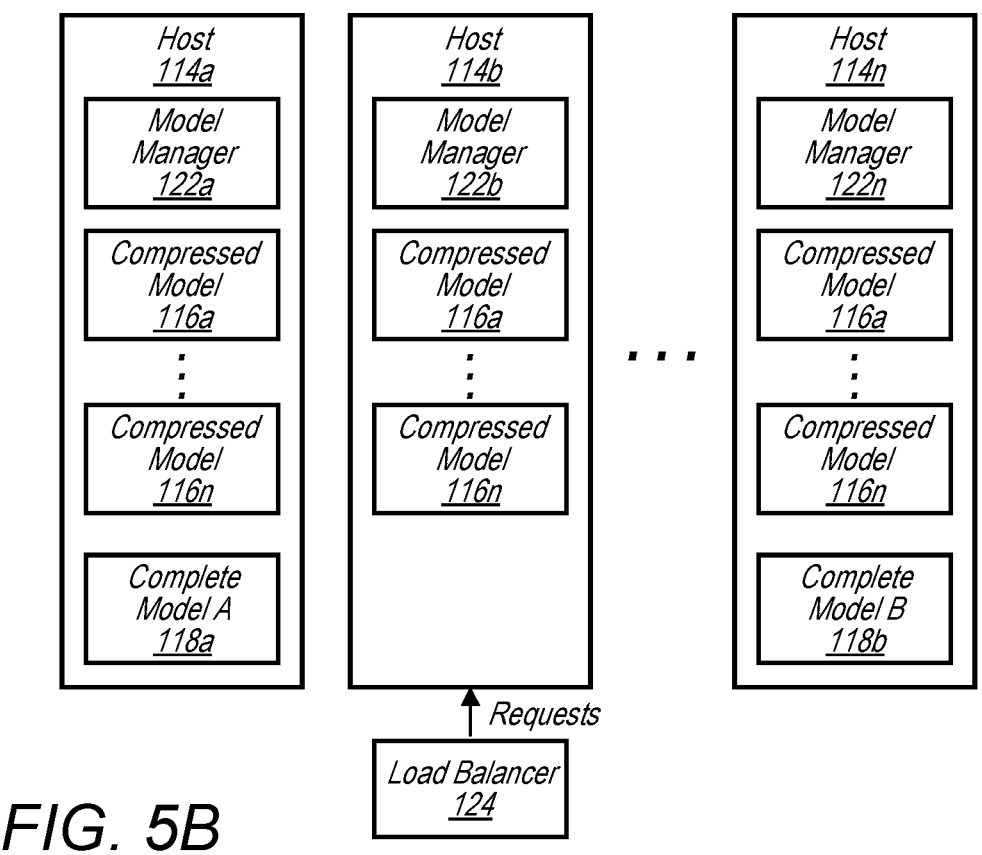
FIG. 5B is a block diagram of a host fleet and a load balancer sending a request to a different host that services the request using a compressed model, according to one embodiment.

FIG. 5B is a block diagram of a host fleet and a load balancer sending a request to a different host that services the request using a compressed model, according to one embodiment. At a subsequent time period, the load balancer receives one or more additional requests to process data, the one or more additional requests indicating the same model to process the data (e.g., model B).

In the example embodiment, the load balancer determines that there are not any hosts available to process the data for the additional requests using a complete version of the indicated model. Even though the host 114n has the complete version loaded (complete model B), the host is not available to process the data for the additional requests because the overall workload of the host 114n is above at or above a threshold amount (e.g., due to processing data using the complete model B).

In response, the load balancer selects the host 114b from among the hosts that are available to process the request (e.g., 114b-114m) according to a load balancing algorithm. The load balancer then sends the one or more additional requests to the selected host 114b to process the data using the compressed model that corresponds to the indicated model.

Figure 5C:
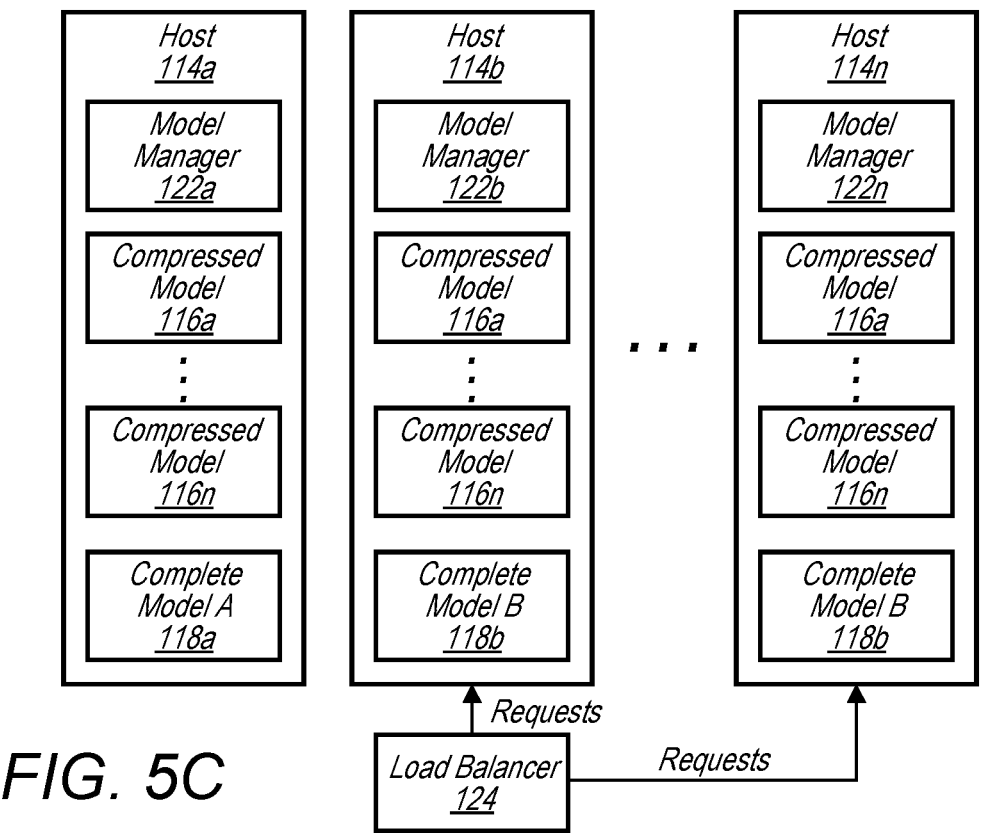
FIG. 5C is a block diagram of a host fleet and a load balancer sending requests to hosts that service the requests using a complete model, according to one embodiment.

FIG. 5C is a block diagram of a host fleet and a load balancer sending requests to hosts that service the requests using a complete model, according to one embodiment. At a subsequent time period, the load balancer receives one or more additional requests to process data, the one or more additional requests indicating the same model to process the data (e.g., model B). As shown, hosts 114b and 114n are available to accept requests to process data using complete model B. The load balancer may send requests to hosts 114b or 114n according to a load balancing algorithm, as discussed above. In embodiments, the load balancer will send requests to hosts that have the complete model loaded and are available to take more requests (e.g., the workload of the host is below a threshold amount), but if none are available, then the load balancer will send the requests to a host that is available to process the request using the corresponding compressed model.

Figure 5D:
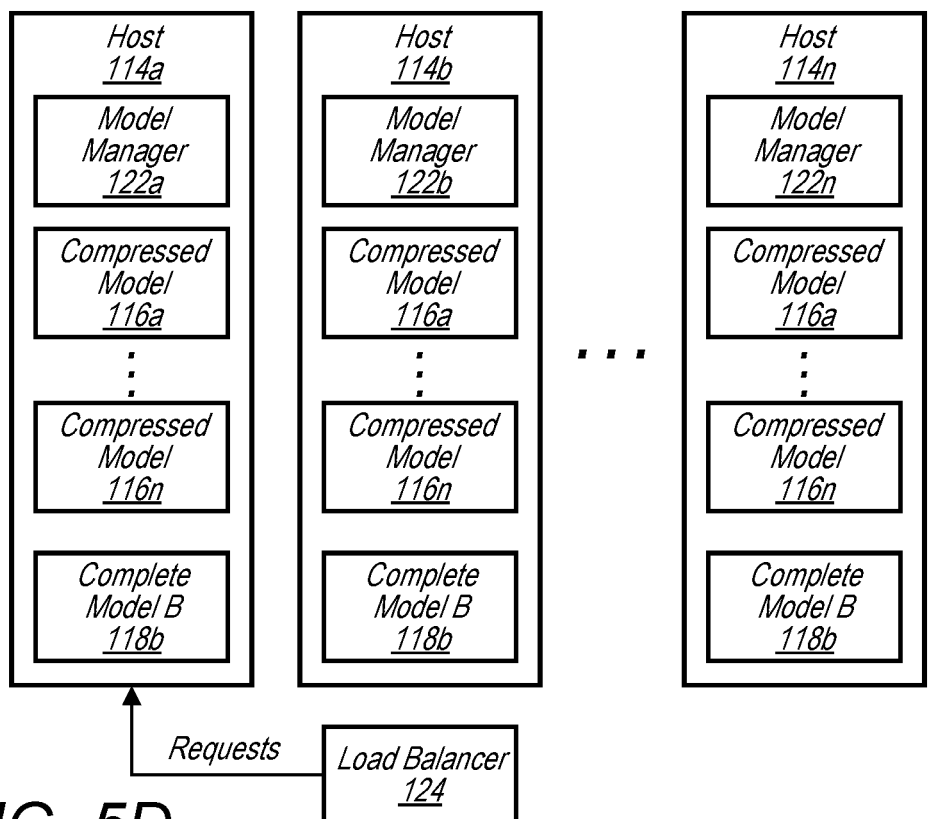
FIG. 5D is a block diagram of a host fleet and a load balancer sending a request to a particular host that services the request using a newly-loaded complete model, according to one embodiment.

FIG. 5D is a block diagram of a host fleet and a load balancer sending a request to a particular host that services the request using a newly-loaded complete model, according to one embodiment. As shown, the host 114a removed complete model A from memory and loaded complete model B into memory (e.g., based on commands from the model manager and/or the load balancer). This may occur, for example, if the model manager and/or the load balancer determines that the amount of data being processed by complete model A is below a threshold amount for a threshold period of time and/or is the number of requests that indicate model B is higher than those that indicate model A for a threshold period of time.

Figure 6:
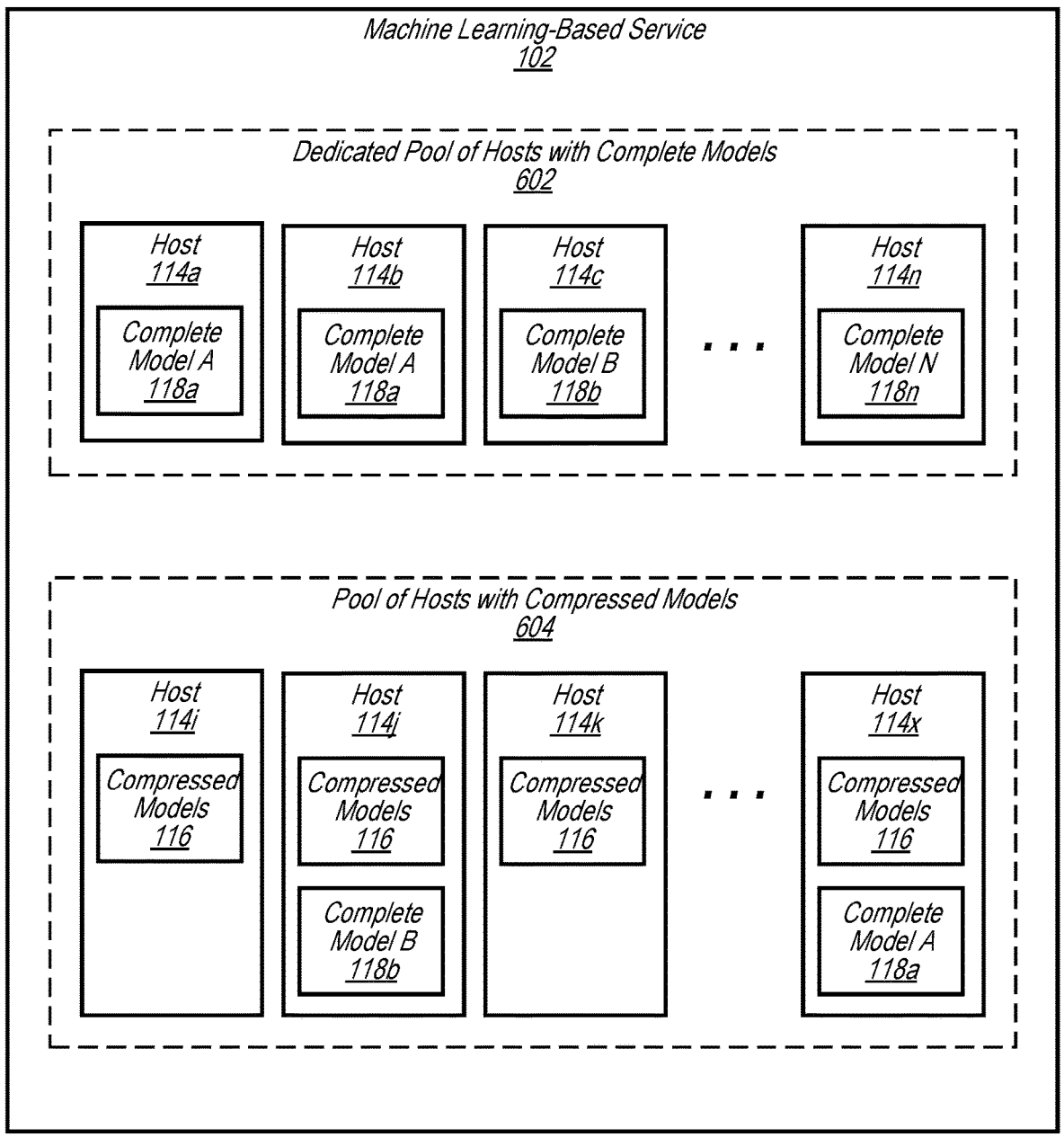
FIG. 6 is a block diagram of a dedicated pool of hosts with complete models and another pool of hosts with compressed models, according to one embodiment.

FIG. 6 is a block diagram of a dedicated pool of hosts with complete models and another pool of hosts with compressed models, according to one embodiment.

FIG. 4 is a flowchart illustrating a method for downloading user settings and executing an application on a compute instance in accordance with the user settings, according to one embodiment. In embodiments, the machine learning-based service 102 may include a dedicated pool 602 of hosts that each include a complete version of a model. As depicted, any number of hosts may include a particular complete model in its memory. For example, two hosts include complete model A in memory.

In embodiments, when a load balancer receives one or more requests to process data, the load balancer will send the one or more requests to a selected host in the dedicated pool if the load balancer determines that there is at least one host in the dedicated pool that is available to accept and process the one or more requests (e.g., at least one host has the indicated complete model (e.g., model A) in memory and the host workload is below a threshold amount). If not, then the load balancer will determine if there is at least one host in the pool 604 of hosts with compressed models that is available to accept and process the one or more requests (e.g., at least one host has the indicated complete model in memory (e.g., model A) and the host workload is below a threshold amount). If so, the load balancer selects a host and sends the one or more requests to that host (e.g., host 114n) for processing by the complete model. If not, then the load balancer will select another host of the pool 604 and send the one or more requests to that host for processing by the corresponding compressed model (e.g., host 114a).

Figure 7:
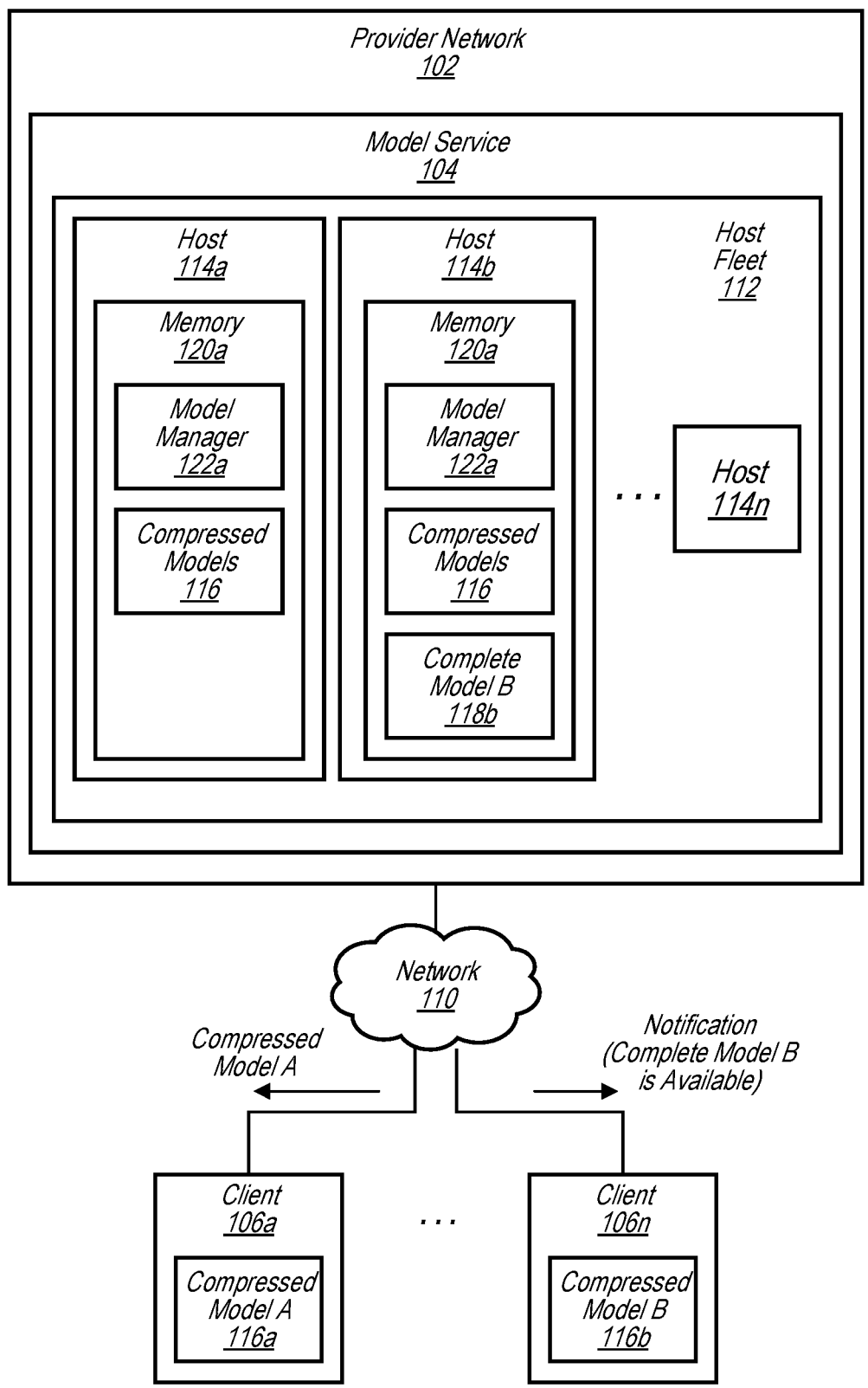
FIG. 7 illustrates a system for sending compressed machine learning models to clients for local processing, according to one embodiment.

FIG. 7 illustrates a system for sending compressed machine learning models to clients for local processing, according to one embodiment. In the depicted embodiment, the machine learning-based service 102 receives from the client 106a a request to process data, wherein the request indicates model A. In embodiments, if there are no available hosts to process the request using complete model A, then the service 102 sends the corresponding compressed model A 116a to the client and begins loading the complete model A into the memory of a selected host (e.g., host 114a). The client 106a may begin processing data locally using the downloaded compressed model A 116a to generate results locally.

When the complete model A is loaded into the memory of the selected host, then the service 102 may notify the client 106a that the complete model A is loaded. The service 102 may then begin receiving requests to process data from the client 106a, wherein the requests indicate model A. The selected host may process the data using the complete model A, generate results, and send the results to the client 106a. As shown, another client 106n is receiving a notification that the complete model B has been loaded (e.g., in host 114b). The client 106n may begin sending requests to the service to be processed by the complete model B at host 114b.

Figure 8:
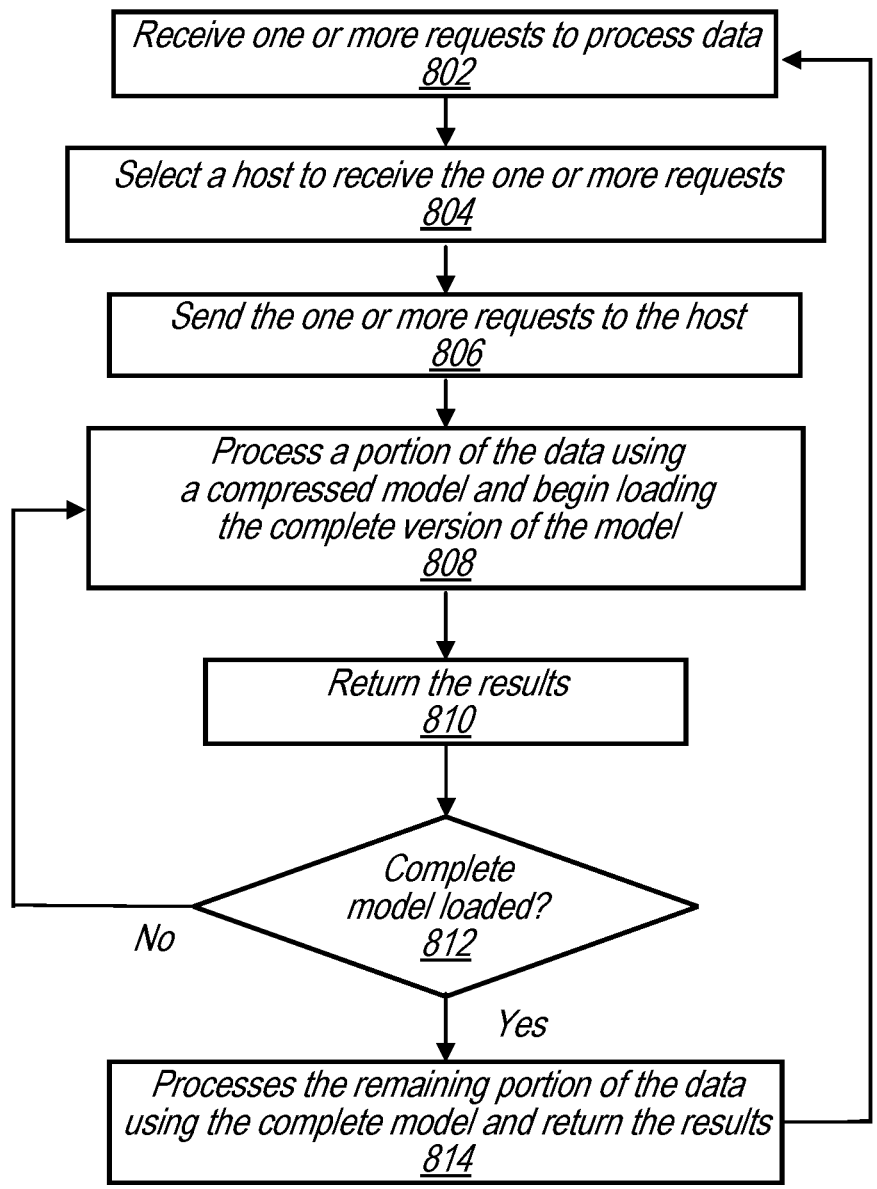
FIG. 8 is a flowchart illustrating a method for processing requests using compressed and complete machine learning models, according to one embodiment.

FIG. 8 is a flowchart illustrating a method for processing requests using compressed and complete machine learning models, according to one embodiment. At block 802, the machine learning-based service 102 (e.g., a load balancer) receives one or more requests to process data. The one or more requests may indicate a model to process the data.

At block 804, a load balancer selects a host to receive the one or more requests. At block 806, the load balancer sends the one or more requests to the selected host. At block 808, the selected host processes a portion of the data using a compressed model and begins loading the complete version of the indicated model. At block 810, the service returns the results.

At block 812, the service determines whether the complete model is loaded. If so, then at block 814, the host processes another portion (e.g., remaining portion) of the data using the complete data and returns to results (e.g., to a client or other endpoint). Otherwise, the host processes another portion of the data using the compressed model.

Figure 9:
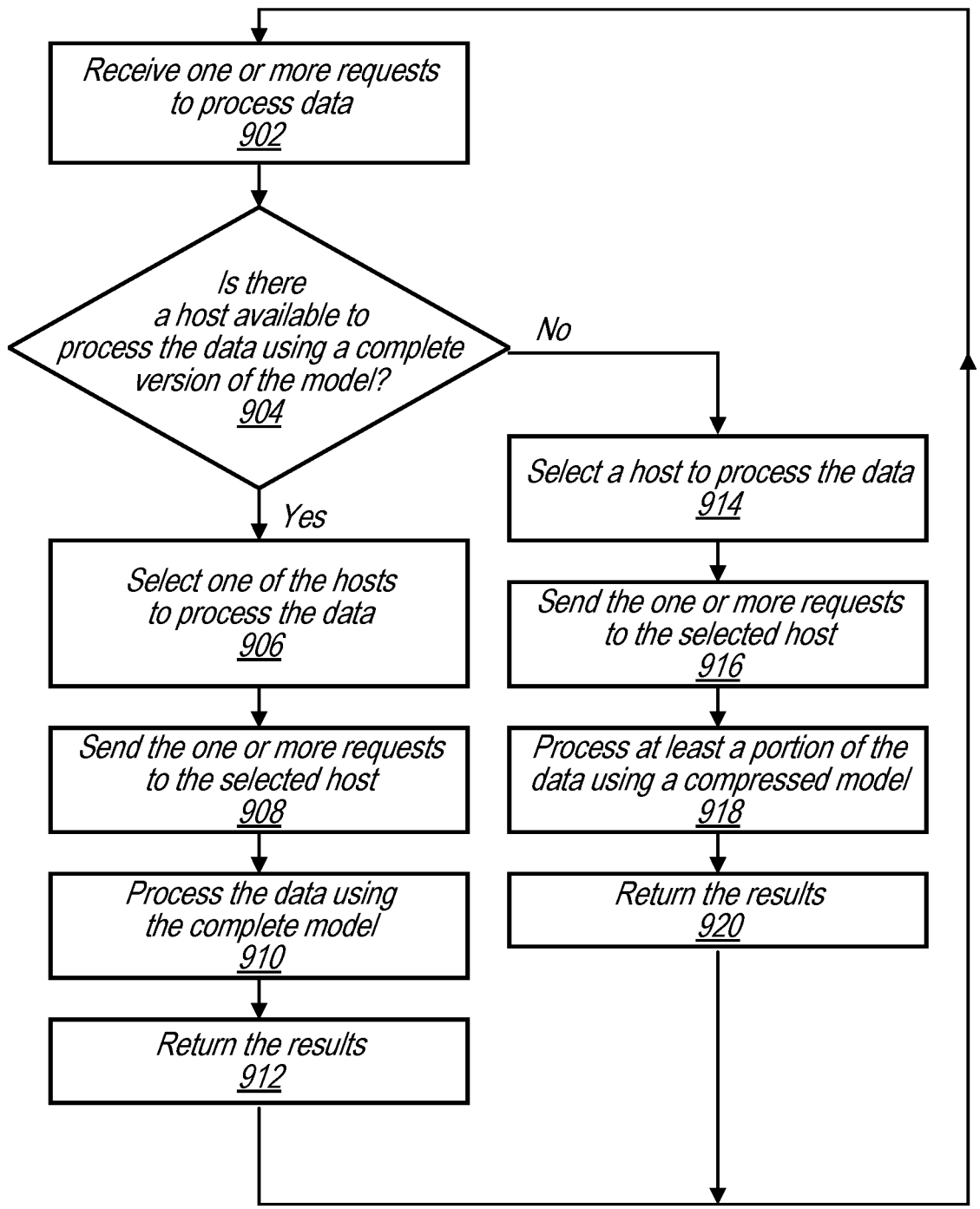
FIG. 9 is a flowchart illustrating a method for processing requests using compressed and complete machine learning models, according to one embodiment.

FIG. 9 is a flowchart illustrating a method for processing requests using compressed and complete machine learning models, according to one embodiment. At block 902, the machine learning-based service 102 (e.g., a load balancer) receives one or more requests to process data. The one or more requests may indicate a model to process the data.

At block 904, a load balancer determines whether there are any hosts available to process the data using the complete version of the indicated model. If so, at block 906, the load balancer selects one of the available hosts to process the data using the complete version of the model. At block 908, the load balancer sends the one or more requests to the selected available host. At block 910, the selected host processes the data using the complete version of the indicated model. At block 912, the service returns the results. The process then returns to block 902.

Returning to block 904, if the service determines that there are not any hosts available to process the data using the complete version of the indicated model, then at block 914, the load balancer selects a host to process the data using a compressed version of the model. At block 916, the load balancer sends the one or more requests to the selected host. At block 918, the selected host processes the data using the compressed version of the indicated model. At block 920, the service returns the results. The process then returns to block 902.

Figure 10:
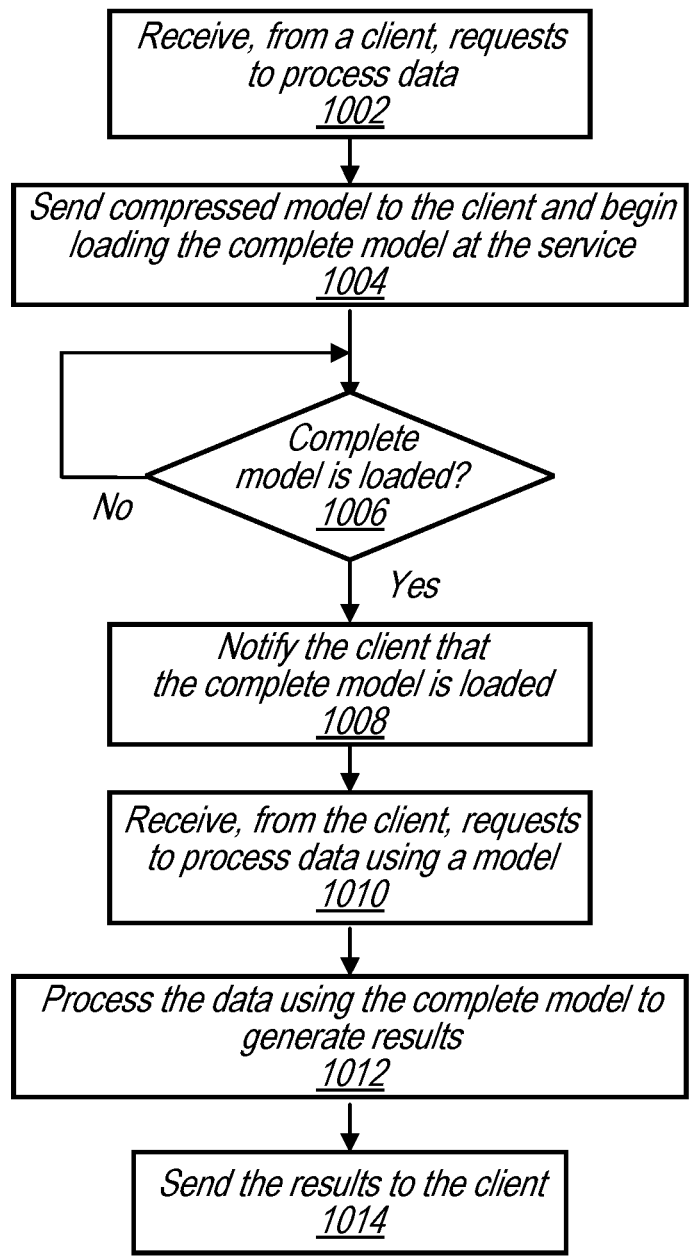
FIG. 10 is a flowchart illustrating a method for using compressed machine learning models by clients for local processing, according to one embodiment.

FIG. 10 is a flowchart illustrating a method for using compressed machine learning models by clients for local processing, according to one embodiment. At block 1002, the machine learning-based service 102 receives from a client a request to process data, wherein the request indicates a model. At block 1004, the service sends the corresponding compressed model to the client and begins loading the complete model into the memory of a selected host. In embodiments, the client may begin processing data locally using the downloaded compressed model to generate results locally.

At block 1006, the service determines whether the complete model is loaded in the memory of the selected host. If not, then the process returns to block 1006 and the client may continue to process data locally using the downloaded compressed model to generate results. If so, then at block 1008, the service notifies the client that the complete model is loaded.

At block 1010, the service receives additional requests to process data from the client, wherein the requests indicate the model. At block 1012, the selected host may process the data using the complete model to generate results. At block 1014, the service sends the results to the client 106a.

Any of various computer systems may be configured to implement processes associated with the provider network, remote networks, machine learning-based service, storage service, or any component of the above figures. For example, FIG. 11 is a block diagram illustrating an example computer system that implements some or all of the techniques described herein, according to some embodiments.

Figure 11:
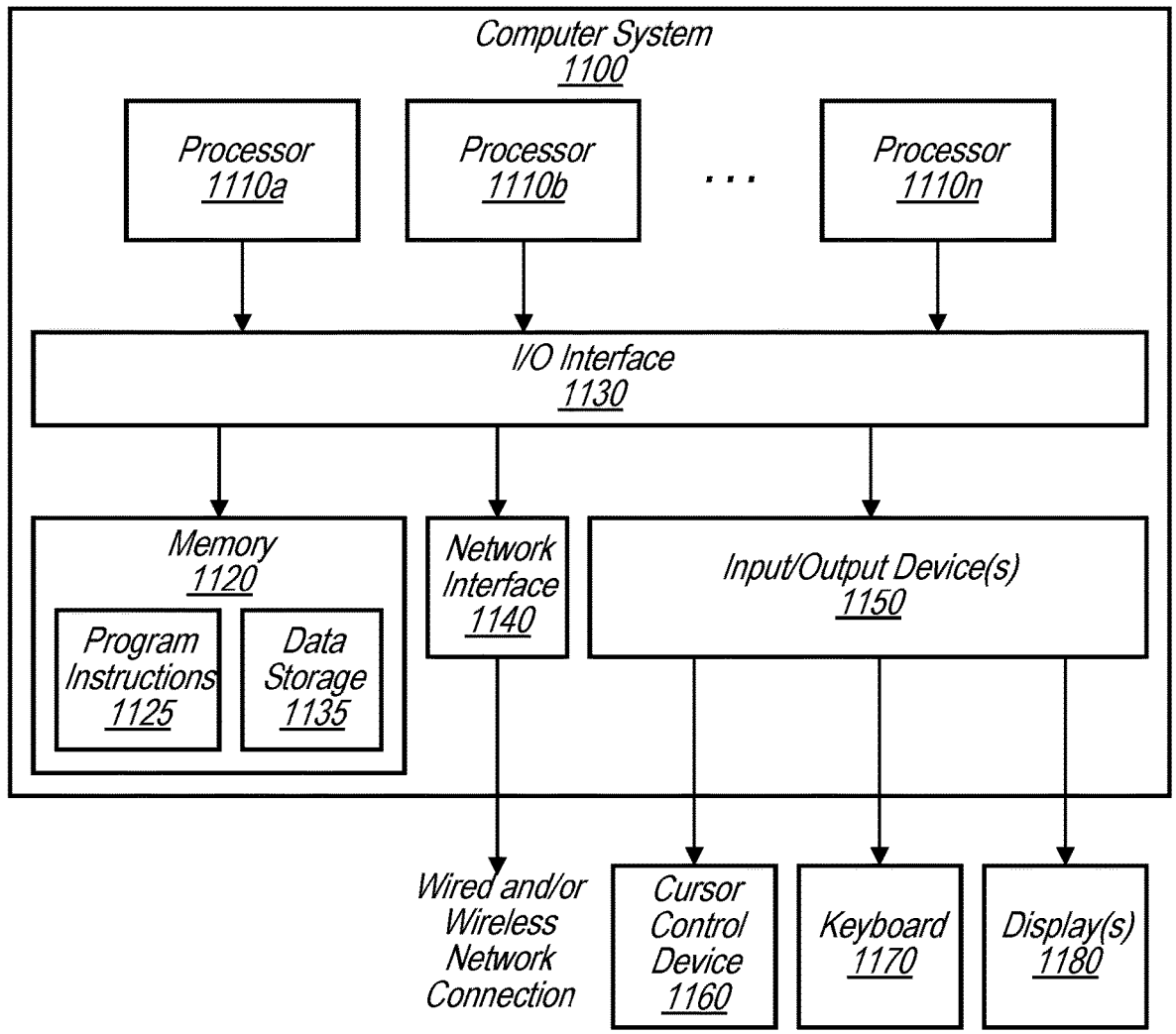
FIG. 11 is a block diagram illustrating an example computer system that implements some or all of the techniques described herein, according to some embodiments.

In various embodiments, the provider network, client networks, machine learning-based service, storage service, or any other component of any of FIGS. 1-10 may each include one or more computer systems 1100 such as that illustrated in FIG. 11. In embodiments, the provider network, client networks, machine learning-based service, storage service, or any other component may include one or more components of the computer system 1100 that function in a same or similar way as described for the computer system 1100.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or a downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be embedded processors implementing any of a variety of instruction set architectures (ISAs), such as the x106, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the provider network (e.g., model manager, compressed models, complete models), client devices/networks, or remote networks are shown stored within system memory 1120 as program instructions 1125. In some embodiments, system memory 1120 may include data 1135 which may be configured as described herein.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other computer systems 1100 or devices attached to a network, such as the local network discussed above, a wide-area network, or a local network within the provider network, for example. In particular, network interface 1140 may be configured to allow communication between computer system 1100 and/or various I/O devices 1150. I/O devices 1150 may include scanning devices, display devices, input devices and/or other communication devices, as described herein. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In some embodiments, I/O devices 1150 may be relatively simple or "thin" client devices. For example, I/O devices 1150 may be configured as dumb terminals with display, data entry and communications capabilities, but otherwise little computational functionality. However, in some embodiments, I/O devices 1150 may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices 1150 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1150 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device 1150 (e.g., cursor control device 1160, keyboard 1170, or display(s) 1180 may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the machine learning-based service and various services or devices of the provider networks, remote networks, client networks, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more hosts of a provider network respectively comprising processors and memory to implement at least a portion of a machine learning-based service, individual ones of the hosts comprising a plurality of compressed models stored in the memory, wherein each of the compressed models is a compressed version of a corresponding complete version of a model, and wherein at least one of the hosts is configured to:
  receive a request to process data, wherein the request indicates the data to be processed;
  in response to reception, by the host of the provider network, of the request to process the data, process, by the host of the provider network, an initial portion of the data using one of the compressed versions of models that corresponds to a complete version of a model to generate one or more results and begin loading, by the host of the provider network, of the complete version of the model into the memory of the host of the provider network;
  return the one or more results in response to the generation of the one or more results;
  complete the loading of the complete version of the model into the memory of the host;
  in response to a determination, by the host, that the complete version of the model is loaded into the memory of the host, process a remaining portion of the data indicated by the same request to process the data using the complete version of the model instead of the compressed version of the model that was used to process the initial portion of the data indicated by the same request to process the data to generate one or more other results,
  wherein the complete version of the model is larger than the compressed version and produces more accurate results than the compressed version; and
  return the one or more other results in response to the generation of the one or more other results.

2. The system as recited in claim 1, further comprising a load balancer configured to distribute requests to respective hosts of a plurality of the hosts respectively comprising the plurality of compressed models, wherein the load balancer is further configured to perform:
  receive the request to process the data;
  determine that there are not any hosts of the plurality of hosts available to process the data using the complete version of the model;
  in response to the determination that there are not any hosts available to process the data using the complete version of the model, select the host from among the plurality of hosts according to a load balancing algorithm; and
  send the request to the host.

3. The system as recited in claim 2, wherein the host is further configured to perform one or more of:
  indicate to the load balancer that the complete model began loading into the memory of the host, or
  indicate to the load balancer that the complete model has completed loading into the memory of the host.

4. The system as recited in claim 1, wherein the request indicates a location of the data to be processed or include the data to be processed, and wherein to begin the loading of the complete version of the model into the memory of the host, the host is configured to perform:
  determine that an amount of data to be processed using the compressed version of the model exceeds a threshold amount; and
  in response, begin to load the complete version of the model into the memory of the host.

5. The system as recited in claim 1, wherein the compressed model comprises:
  a quantized version of the complete model, a fewer number of layers than the complete model, or
  a different type of model than the complete model.

6. A method, comprising:
performing, by a host of a machine learning-based service of a provider network:
  receiving a request to process data, wherein the request indicates the data to be processed;
  in response to receiving the request to process the data, processing an initial portion of the data using a compressed version of a model that corresponds to a complete version of the model to generate one or more results and begin loading, by the host of the provider network, of the complete version of the model into the memory of the host of the provider network;
  returning the one or more results;
  complete the loading of the complete version of the model into a memory of the host;
  in response to a determination, by the host, that the complete version of the model is loaded into the memory of the host, process a remaining portion of the data indicated by the same request to process the data using the complete version of the model instead of the compressed version of the model that was used to process the initial portion of the data indicated by the same request to process data to generate one or more other results; and
  returning the one or more other results.

7. The method as recited in claim 6, wherein the host is one of a plurality of hosts of the machine learning-based service, each host comprising one or more compressed models stored in the memory, wherein each of the compressed models is a compressed version of a corresponding complete version of a model, and further comprising:
  performing, by a load balancer:
    receiving the request to process the data;
    determining that there are not any hosts of the plurality of hosts available to process the data using the complete version of the model;
    in response to determining that there are not any hosts available to process the data using the complete version of the model, selecting the host from among the plurality of hosts according to a load balancing algorithm; and
    sending the request to the host.

8. The method as recited in claim 7, further comprising:
performing, by the host:
  indicating to the load balancer that the complete model began loading into the memory of the host, or
  indicating to the load balancer that the complete model has completed loading into the memory of the host.

9. The method as recited in claim 6, further comprising:
performing, by the load balancer:
  receiving from a client one or more other requests to process other data, wherein the one or more other requests indicate another model to process the other data;
  sending a compressed version of the other model to the client;
  determining that a complete version of the other model is available to process requests at the host or another host of the machine learning-based service;
  notifying the client that the complete version of the other model is available to process requests at the machine learning-based service;
  receiving from the client one or more additional requests to process additional data, wherein the one or more additional requests indicate the other model to process the additional data; and sending the one or more additional requests to the host or the other host to process the additional data using the complete version of the other model.

10. The method as recited in claim 9, wherein determining that a complete version of the other model is available to process requests at the host or another host comprises:

determining, by the load balancer, that:

the complete version of the other model has completed loading into memory of the host or the other host, or an overall load at the host or the other host is below a threshold amount, wherein the host or the other host comprises the other model in memory.

11. The method as recited in claim 6, further comprising:

performing, by the host:

determining that an amount of data to be processed using the compressed version of the model exceeds a threshold amount; and in response, begin loading the complete version of the model into the memory of the host.

12. The method as recited in claim 6, wherein the determining that the amount of data to be processed using the compressed version exceeds a threshold amount is based on one or more of:

a size of the data to be processed using the compressed version, a number of received requests to be processed using the compressed version, a rate of received requests to be processed using the compressed version, a change in the rate of received requests to be processed using the compressed version, or a predicted amount of data to be processed using the compressed version.

13. The method as recited in claim 6, wherein the compressed model is one of a plurality of compressed models stored in the memory of the host, wherein each of the compressed models is a compressed version of a corresponding complete version of a model, and wherein processing the portion of the data using the compressed version of the model comprises:

determining that the compressed version corresponds to the model by the request;

in response to determining that the compressed version corresponds to the model by the request, selecting the compressed version from among the plurality of compressed models to process the data; and processing the portion of the data using the compressed version of the model.

14. The method as recited in claim 6, wherein the request indicates the model.

15. One or more non-transitory computer-accessible storage media storing program instructions that when executed on or across one or more processors cause the one or more processors to:

perform, by a host of a machine learning-based service of a provider network:

receiving a request to process data, wherein the request indicates the data to be processed;

in response to receiving the request to process the data, process an initial portion of the data using a compressed version of a model that corresponds to a complete version of the model to generate one or more results and begin loading, by the host of the provider network, of the complete version of the model into the memory of the host of the provider network;

return the one or more results;

complete the loading of the complete version of the model into a memory of the host;

in response to a determination, by the host, that the complete version of the model is loaded into the memory of the host, process a remaining portion of the data indicated by the same request to process the data using the complete version of the model instead of the compressed version of the model that was used to process the initial portion of the data indicated by the same request to process data to generate one or more other results; and return the one or more other results.

16. The one or more storage media as recited in claim 15, wherein to load the complete version of the model into the memory of the host, the program instructions when executed on or across the one or more processors:

determine that an amount of data to be processed using the compressed version of the model exceeds a threshold amount; and in response, begin to load the complete version of the model into the memory of the host.

17. The one or more storage media as recited in claim 16, wherein the determination that the amount of data to be processed using the compressed version exceeds a threshold amount is based on one or more of:

a size of the data to be processed using the compressed version, a number of received requests to be processed using the compressed version, a rate of received requests to be processed using the compressed version, a change in the rate of received requests to be processed using the compressed version, or a predicted amount of data to be processed using the compressed version.

18. The one or more storage media as recited in claim 15, wherein the host is one of a plurality of hosts of the machine learning-based service, each of the hosts respectively comprising one or more compressed models, and wherein the program instructions when executed on or across the one or more processors:

indicate to one or more other hosts of the plurality of hosts that the complete model began loading into the memory of the host, or indicate to the one or more other hosts of the plurality of hosts that the complete model has completed loading into the memory of the host.

19. The one or more storage media as recited in claim 15, wherein the host is one of a plurality of hosts of the machine learning-based service, each of the hosts respectively comprising one or more compressed models, and wherein the program instructions when executed on or across the one or more processors:

indicate to the load balancer that the complete model began loading into the memory of the host, or indicate to the load balancer that the complete model has completed loading into the memory of the host.

20. The one or more storage media as recited in claim 15, wherein the compressed model comprises:
- a quantized version of the complete model, a fewer number of layers than the complete model, or
- a different type of model than the complete model, wherein the compressed model is smaller than the complete model.

* * * * *